Patented Sept. 9, 1941

2,255,082

UNITED STATES PATENT OFFICE 2,255,082

CAPILLARY ACTIVE COMPOUNDS AND PROCESS OF PREPARING THEM

Ludwig Orthner, Carl Platz, and Hans Keller, Frankfort-on-the-Main, and Heinz Sönke, Bad Soden in Taunus, Germany, assignors, by mesne assignments, to General Aniline & Film Corporation, New York, N. Y., a corporation of Delaware No Drawing. Application January 14, 1939, Serial No. 250,924. In Germany January 17, 1938

11 Claims. (Cl. 260—458)

The present invention relates to capillary active compounds and to a process of preparing them.

We have found that agents of high capillary action are obtainable by introducing hydrophilic groups, directly or indirectly, into an amine of the following general formula

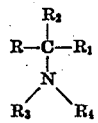

wherein R and $R_1$ stand for aliphatic hydrocarbon radicals, each containing at least three carbon atoms and R and $R_1$ together containing at least 11 carbon atoms, $R_2$, $R_3$ and $R_4$ stand for hydrogen or organic radicals.

Amines containing the atom group

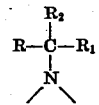

which are suitable for use in the process of the invention are, for instance, 7-aminotridecane, 8-aminopentodecane, 9-aminoheptodecane, 10-aminononadecane, 5-aminotetradecane, 8-amino-5.7-diethylpentadecane, 9-hydroxyethylaminoheptadecane, 9-methylaminoheptadecane, 8-benzylaminopentadecane. Such amines may, for instance, be obtained by transforming a carboxylic acid into the ketone, then causing the products obtained to react with ammonia or an amine and hydrogenating it. Suitable carboxylic acids are, for instance, butyric acid, isobutyric acid, isovaleric acid, caproic acid, caprylic acid, capric acid, lauric acid, palmitic acid, alpha-ethylhexylic acid. These carboxylic acids may be transformed into the corresponding ketones, either alone or in admixture with each other, amines being thus obtained in which the radicals R and $R_1$ are either equal or different. The ketones thus obtained are then hydrogenated in the presence of ammonia or of an amine, such as methylamine, hexylamine, benzylamine or ethanolamine. The above amines may be used as such or in admixture with one another. The parent materials may also be prepared from commercial mixtures of carboxylic acids. It is, for instance, possible to transform into amines, by way of ketones, the carboxylic acid mixtures formed in the oxidation of paraffin or of mineral oils. There are further suitable the mixtures of carboxylic acids which are obtained by treating with alkali the alcohols of high molecular weight formed in the catalytic hydrogenation of carbon oxides.

Parent materials suitable for the preparation of the amines are also carboxylic acids or mixtures of carboxylic acids which are obtained by treating carbon monoxide or carbon dioxide, in the presence of an olefine and perhaps of hydrogen, with steam or by causing a halogenated hydrocarbon to react with potassium cyanide and saponifying the product obtained.

The amines may also be obtained by other known methods, for instance, by causing suitable halogenated hydrocarbons to react with ammonia or amines.

Hydrophilic groups are introduced into these amines by known methods. The amines may be rendered soluble in water by treating them with a poly-basic inorganic acid or its anhydride or a chloride thereof, such as sulfuric acid, fuming sulfuric acid, sulfuric anhydride, chlorosulfonic acid, potassium chlorosulfonate, sodium fluorosulfonate, aminosulfonic acid, phosphoric acid, phosphoric anhydride, phosphorous anhydride, boric acid, boric anhydride. In case the amines contain hydroxyl groups, they may be made water-soluble, for instance, by treating them with sulfuric acid, chlorosulfonic acid or fuming sulfuric acid, sulfuric acid esters being thus formed. If the amines contain double bonds, addition products are formed by the action of the sulfonating agents, whereas in the presence of aromatic nuclei aromatic sulfonic acids are mainly formed. If the amines are free from OH-groups, double bonds and aromatic nuclei, they may be made soluble in water by treating them, in the presence of pyradine, with chlorosulfonic acid or sulfuric anhydride; sulfamic acids are thus obtained. When phosphorus chlorides are used, such as phosphorus pentachloride, phosphorous oxy-chloride, phosphorus trichloride, the solubility in water is obtained in the following way: some of the chlorine atoms react with the amines hydrogen chloride being evolved and the remaining chlorine atoms are hydrolyzed, in a second reaction, or, in case hydroxyl groups are present in the molecules, chlorides of phosphoric acid esters are formed which are, thereupon, saponified to form the corresponding acid phosphoric acid esters. The presence of a diluent, is of advantage, such as dimethyl ether, diethyl ether, beta.beta'-dichlorodiethyl ether, dichloro-methane, dichlor-ethane, carbon tetrachloride, sulfur dioxide, further the presence of a tertiary base, such as pyridine, dimethylaniline. The sulfonic acid group may, however, also be introduced in an indirect manner by treating the amines with for instance chlorethanesulfonic acid, bromethanesulfonic acid, benzyl-chloride sulfonic acid, chlorohydroxypropane-sulfonic acid, beta-chloropropanedisulfonic acid, chloracetonesulfonic acid. The sulfonic acid group may, furthermore, be introduced by condensing the amines with aldehyde- or ketone-sulfonic acids, for instance acetaldehyde-disulfonic acid, acetone-mono- and disulfonic acid, benzaldehyde-sulfonic acids and subsequently hydrogenating the products obtained. The amino-alkyl-sulfonic acids thus obtained may then also be transformed into sulfobetaines by treating them with, for instance, methyl chloride, ethyl bromide, dimethyl-sulfate, ethylene oxide, benzyl chloride, sodium butyl sulfate.

The amines may further be rendered soluble in water or in alkali by causing them to react with poly-basic carboxylic acids. Such acids are, for instance, oxalic acid, succinic acid, maleic acid, diglycolic acid, thiodiglycolic acid, dithiodiglycolic acid, phthalic acid, sulfophthalic acid, sulfosuccinic acid. The amines may also be caused to react with the anhydrides, esters or chlorides of such acids.

A further method for rendering the products soluble in water consists in causing the amines to react with halogenated carboxylic acids, salts, esters or amides thereof, such as monochloracetic acid, monochloracetic acid methyl-ester, chloracetamide, beta-chloropropionic acid, bromosuccinic acid and transforming, if desired, the products obtained into betaines, for instance, by treating them with methyl chloride, ethyl bromide, dimethyl sulfate, ethylene oxide, benzyl chloride, sodium butyl sulfate, to improve the fastness of the products to lime, alkali and acids.

The compounds containing amino- or iminogroups may, furthermore, be made water-soluble by transforming them into quaternary ammonium bases by treating them, for instance, with methyl chloride, ethyl bromide, dimethyl sulfate, diethyl sulfate, benzyl chloride.

A further possibility of making the amines soluble in water consists in causing them, preferably in the presence of a catalyst, such as an alkali metal, an alkali metal oxide, to react at raised temperature, with alkylene oxides or the corresponding chlorhydrins, especially ethylene oxide, monochlorhydrins, mixtures of ethylene oxide with propylene oxide, or with glycide, epichlorhydrin, glycerol chlorhydrin. Further solubilizing groups may be introduced into the reaction products thus obtained, by treating them with polybasic inorganic acids, by causing them to react with halogen-sulfonic or -carboxylic acids or by means of polycarboxylic acid anhydrides.

A further method of rendering the products water-soluble consists in transforming the amines, by means of phosgene, into isocyanates or carbamic acid chlorides and then condensing these products with amino-acids, such as sarcosine, methyl-taurine, with albumin decomposition products or with amino-poly-hydroxy-compounds such as methylglucamine or hydroxysulfonic acids, such as hydroxy-ethane-sulfonic acid.

Amines have the grouping

may also be rendered water-soluble by transforming them into sulfonic acid amides or carboxylic acid amides which are sulfonated or capable of being sulfonated. The transformation may be carried out by condensing with sulfoacetic acid, sulfopropionic acid, sulfosuccinic acid, sulfobenzoic acid, sulfophthalic acid or with derivatives of these compounds, for instance, esters, acid chlorides or acid anhydrides. Amides capable of being sulfonated are obtained by reaction of the amines with glycolic acid, hydroxyethoxy-acetic acid, lactic acid, glyceric acid, crotonic acid, benzoic acid, benzene-sulfochloride. The amides thus obtained are rendered water-soluble by means of the sulphonating agents mentioned above.

The following products may, for instance, be obtained by the process of the present invention:

(1) Pentadecyl-9 - trimethylammonium bromide:

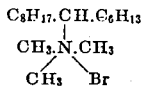

(2) Betaine from undecyl-6-amino-acetic acid:

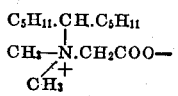

(3) Sulfamic acid from 9-amino-heptadecane:

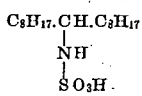

(4) Sulfobetaine from nonadecyl-10-taurine:

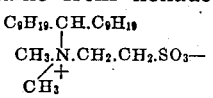

The products obtained by the process of the invention have capillary active properties and may be used for treating materials of various kind, such as textiles, leather, paper and the like. They display a high wetting and emulsifying action; they may also be used with advantage as levelling and penetrative dyeing agents. Some of the products have a washing power or may be used as softening agents. The wetting effect, even in mercerizing liquors, is especially high with compounds in which the radicals R and R₁ contain branched chains. The products may be used as such, in admixture with one another or with other capillary active substances, such as soap and other textile adjuvants, with colloidal substances such as mucilage, glue, water-soluble cellulose derivatives, starch, bentonite saponine or the like or with organic solvents, such as butanol, xylenyl-glycol; but also with inorganic salts, such as Glauber's salt, sodium carbonate, sodium pyrophosphate, trisodium phosphate, sodium metaphosphate or with agents yielding oxygen such as sodium perborate or sodium hypochlorite.

The following examples serve to illustrate the invention, but they are not intended to limit it thereto; the parts are by weight:

(1) Ethylene oxide is led, at 100° C. to 120° C., into 380 parts of an amine-mixture, obtained by transforming palm-kernel fatty acid into the ketone and catalytically hydrogenating the ketone formed in the presence of liquid ammonia and a nickel catalyst, until 8 to 10 mols of ethylene oxide have been absorbed. A water-soluble product is obtained which may be used as levelling and penetrative dyeing agent. The properties of this product may be varied by subjecting it to an after-treatment with dimethyl sulfate.

(2) 12 parts of diglycolic anhydride are added to 22 parts of an amine mixture obtained by transforming a mixture of paraffin carboxylic acids having a mean molecular weight of 150 into the corresponding mixture of ketones and hydrogenating the product obtained in the presence of ammonia. Self-heating occurs and the anhydride dissolves. The mixture is further stirred, for some time, at 70° C. to 80° C. and 7 parts of sodium carbonate and 50 parts of water are then added. A thick solution is obtained which may be used as wetting agent. When 0.6 gram of this product is dissolved in one litre of water, a solution having a high wetting power is obtained.

(3) 270 parts of an amine obtained by transforming a mixture of paraffin-carboxylic acids of $C_7$ to $C_9$ into the corresponding mixture of ketones and catalytically hydrogenating the product obtained in the presence of mono-ethanolamine and, advantageously, methanol as a solvent, are dissolved in 500 parts of ethylene chloride and 130 parts of chlorosulfonic acid are caused to run in, while stirring, within the course of ½ to 1 hour at a temperature comprised between 15 and 20° C. As soon as hydrogen chloride is no longer evolved, the mixture is poured on ice, caustic soda solution is added until the reaction is alkaline to phenolphthalein and the whole is evaporated. A product is obtained which dissolves in water to a clear solution and is suitable for being used as wetting and washing agent.

By treatment with methyl chloride the product may be transformed into a sulfobetaine.

(4) 28 parts of chlorosulfonic acid are introduced, while stirring and cooling, into a solution of 140 parts of chloroform and 42 parts of pyridine. 35 parts of an amine-mixture, obtained from a mixture of paraffin-carboxylic acids having an average molecular weight 170 by transformation into ketone and hydrogenation in the presence of ammonia, are run in and the whole is heated, while stirring, for 4 hours at 50° C. to 55° C. The reaction solution is pressed after cooling, into 66.5 parts of caustic soda solution of 37.5 per cent. strength, while stirring and cooling. The whole is allowed to stand for 15 minutes and then the chloroform layer is separated. After washing twice with a solution of 25 per cent strength of sodium chloride the chloroform layer is dried and then chloroform and pyridine are distilled. There remain 50 parts of sodium sulfaminates. The product may be used as wetting agent.

(5) At 55° C. to 60° C. 31.3 parts of an isocyanate-mixture, obtained from the amine-mixture mentioned in Example 4 by transformation into the hydrochloride and introduction of phosgene, are added, drop by drop, in the course of 2 hours, while stirring, to 68.2 parts of a technical methyltaurine solution containing 17.0 parts of sodium methyltaurine of 100 per cent strength and to which there has been added 0.5 part of caustic soda solution of 37 per cent strength. The whole is stirred for several hours at the temperature indicated and a reaction product is obtained which dissolves in water to a clear solution and which may be used as a strongly foaming washing agent for wool or as a wetting agent. The product possesses a great stability towards salts which cause the hardness of water, acids and alkalies. By dissolving, for instance, 1 to 2 parts of the product in 1000 parts of water of 35 degrees of German hardness and washing therein woolen clothes, there are obtained well cleansed goods having an agreeable feel.

(6) 54 parts of 10-amino-nonadecane and 16 parts of glycolic acid are heated at 165° C. to 175° C., while stirring, and simultaneously nitrogen is introduced. After heating for 8 to 10 hours the amine has been entirely transformed into the amide of the glycolic acid. At 10° C. to 15° C. there are added, suitably in the presence of a solvent, for instance, ethyl ether, to the amide, drop by drop, while stirring, for half-an-hour, 25 parts of chlorosulfonic acid. The reaction product is pressed upon ice and neutralized by means of caustic soda solution. The product has the following constitution:

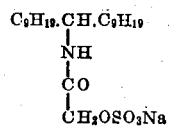

The product dissolves easily in water and forms a strongly foaming solution having good capillary active properties.

By using instead of glycolic acid lactic acid a product of similar properties is obtained.

(7) 27 parts of a sodium bisulfite solution of 38 per cent strength, 12 parts of formaldehyde of 30 per cent strength and 23 parts of 9-aminoheptadecane are well stirred for several hours at 50° C. to 60° C., then a solution of 10 parts of sodium cyanide in 100 parts of water is added, while stirring, at 70° C. to 80° C. and the whole is stirred for some further hours. The oil which separates is washed, dried and then saponified in the following manner:

25 parts of the reaction product obtained are boiled under reflux for 2½ hours in 100 parts of alcohol, 20 parts of water and 28 parts of caustic soda solution containing 8 parts of NaOH. The alcohol is distilled, the residue is dissolved in water and transformed into the betaine by means of dimethylsulfate at 70° C. to 80° C., the reaction being always maintained alkaline to phenolphthalein. The reaction product obtained is distinguished by an absolute stability towards alkalies and acids and may be used in water of the highest degrees of hardness as wetting agent.

(8) 22 parts of an amine mixture of the kind used in Example 2 are heated at 170° C. to 180° C., while stirring, for 8 to 10 hours with 13 parts of benzoic acid suitably while introducing an inert gas. After that time amine is no longer to be found and the amide of the benzoic acid thus obtained is now treated at 10° C. to 15° C. with 15 parts of chlorosulfonic acid and then transformed in the usual manner into an alkali salt, for instance, potassium salt.

(9) 22 parts of an amine-mixture, used in Example 2, are transformed in a manner analogous to that described in the foregoing example into the amide by means of 10 parts of crotonic acid, 12 parts of acetic acid anhydride are added and 12 parts of sulfuric acid monohydrate are run in at 15° C. to 25° C. When the reaction product has become soluble in water, it is pressed on ice and neutralized by means of caustic potash solution. The reaction product obtained may be used as washing agent.

(10) 27 parts of the chloracetamide of 10-amide-nonadecane are introduced into 350 parts of methanol of 75 per cent strength, 20 parts of sodium sulfite are added and the whole is heated to boiling under reflux for 15 hours. The solution is freed from the main part of methanol by distillation. Small parts of unsulfonated substance may be separated by distillation under reduced pressure or by shaking the aqueous solution with solvents which are not mixable with water. The product obtained may be used as levelling or wetting agent.

(11) 1200 parts of a mixture of primary amines, used in Example 2, are dissolved in 1000 parts of methanol, 450 parts of paraformaldehyde are added, and there is introduced a nickel-pumice catalyst containing 6 per cent of nickel (100 per cent), namely such a quantity that 5 parts of nickel are calculated per 100 parts of amine. The whole is then introduced into a hydrogenation autoclave provided with a stirrer, hydrogen is pressed in by means of a pressure up to 50 atmospheres and the whole is hydrogenated at 70° C. to 80° C. After a few hours the hydrogenation is finished. The whole is filtered from the catalyst, methanol is distilled, the remaining amine is dried and 1200 parts of a mixture of tertiary amines is obtained. On distilling under reduced pressure there are obtained between 115° C. and 165° C. under a pressure of 3 mm. mercury 1150 parts of a colorless oil containing 5.03 per cent of nitrogen which may be titrated and 4.98 per cent of tertiary nitrogen.

To 28 parts of the amine-mixture thus obtained there are added 18 parts of bromacetic acid ethyl ester and the whole is stirred for about 4 hours at 90° C. to 100° C. The reaction product dissolves in cold water to a clear solution and represents a betaine-ester which may easily be saponified by means of caustic soda solution. The reaction product may be used as such or after saponification for a great number of chemical purposes in the textile industry, for instance, as auxiliary agent in dyeing. The product may also be prepared by using instead of bromacetic acid ethyl ester chloracetic acid ethyl ester to which some per cent of bromacetic acid ethyl ester have been added.

(12) 14 parts of benzylchloride are added to 28 parts of the mixture of tertiary amines used in the foregoing example and the whole is stirred at 90° C. to 100° C. until a test portion taken from the solution dissolves in water to a clear solution which remains clear even on addition of a small quantity of caustic soda solution. The product is a quaternary ammonium chloride, which may be used as auxiliary agent in the dyeing industry as the product of the foregoing example, furthermore as a disinfectant washing agent.

(13) 0.5 gram of solution methylate are added to 28 parts of 10-aminononadecane and at 150° C. to 160° C. 13 parts of ethylene oxide are introduced. 14 parts of dimethylsulfate are added to the reaction product and the whole is stirred at a raised temperature until the reaction product dissolves in water to a clear solution and remains dissolved even on addition of a small quantity of dilute caustic soda solution. The reaction product has the following constitution:

C₉H₁₉.CH.C₉H₁₉
|
CH₃.N.(CH₂—CH₂O)₃H
/ \
CH₃  OSO₃CH₃

The reaction product may very well be used as stripping agent, for instance, for the dyestuff No. 1228 of Schultz's Farbstofftabellen, vol. 1 (1931).

(14) 1 part of sodium methylate is added to 250 parts of a mixture of amines, used in Example 2, and at 150° C. to 160° C. ethylene oxide is introduced until 1050 parts are absorbed. The reaction product possesses a very good stability towards metal salts, a very good dispersive power for lime soap and may also be used as emulsifying agent for mineral oil and olive oil.

(15) 16 parts of glycolic acid are added to 68 parts of 12-aminotricosane and the whole is heated, while stirring and introducing dry nitrogen, at 180° C. to 200° C. After heating for 9 hours basic nitrogen can practically no longer be detected. The glycolic acid amide may be purified by recrystallisation from cyclohexane and melts at 89° C. to 92° C.

This amide may be sulfonated in the same manner as described in Example 6. The reaction product has a constitution similar to that of the product obtained by the process of Example 6; it dissolves in hot water and forms strongly foaming solution having capillary active properties.

(16) 14 parts of dimethylsulfate are added, while stirring at 60° C. to 70° C. to 34 parts of 8-amino-tricosane, and the whole is stirred until a test portion dissolves in water to a clear solution which remains clear even on addition of a small quantity of dilute caustic soda solution.

(17) 6-amino-tricosane is transformed in the same manner as that described in Example 11 into 6-dimethylamino-tricosane. 2 parts of bromacetic acid ethyl ester and 12 parts of chloracetic acid methyl ester are added to 36 parts of this amine and the whole is heated for 5 hours, under reflux at 85° C. to 90° C., while stirring. The whole is stirred together with a solution of 5.6 parts of potassium hydroxide in 45 parts of water and the whole is stirred for a short time at 50° C. to 60° C. The reaction product has the following constitution:

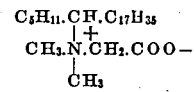

and may be used for washing white goods.

(18) 28 parts of 5-amino-nonadecane and 8 parts of glycolic acid are heated, while stirring and introducing nitrogen, at 175° C. to 185° C. After heating for 8 to 10 hours basic nitrogen can practically no longer be detected. At 10° C. to 20° C. 12.5 parts of chlorosulfonic acid are added, drop by drop, while stirring, in the course of half-an-hour to the amide obtained which has suitably been dissolved in a solvent, for instance, cyclohexane. The reaction product is worked up as described in Example 6. It has the following constitution:

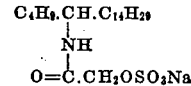

and may be used as washing agent for wool and white goods.

(19) 4-amino-heptadecane is transformed in a manner analogous to that described in Example 5 into the isocyanate. 28 parts of this isocyanate are added, drop by drop, while well stirring, at about 75° C. to a solution of 22 parts of metanilic acid in 40 parts of water to which there has been added a solution of 4 parts of caustic soda in 10 parts of water and the whole is stirred for about 10 hours at the temperature indicated. The reaction product dissolves in water to a clear solution. It has the following constitution:

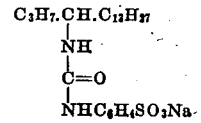

and may be used as levelling agent for dyeing in an acid bath. Instead of metanilic acid there may also be used sulfanilic acid or ethanolaminesulfuric acid ester.

(20) 10-amino-nonadecane is transformed in a manner analogous to that described in Example 5 into the isocyanate. 30 parts of this isocyanate are added, drop by drop, while well stirring, at 60° C. into a solution of 23 parts of sodium N-butyl-taurine in 60 parts of water and the whole is stirred until the reaction products dissolves in water to a clear solution. The reaction product has the following constitution:

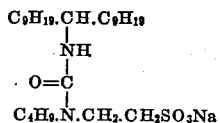

The reaction product is a very good wetting agent at a raised temperature. Products of the same properties are obtained by using instead of n-butyltaurine, propyl-, isobutyl-, isohexyl-, isoheptyl-, hydroxyethyl- or alpha-ethyl-hexyltaurine.

(21) 19 parts of sodium sulfacetate (HO₂C.CH₂.SO₃Na)

are added to 28 parts of 4-aminoheptadecane and the whole is heated at 150° C. to 160° C., the water formed during the reaction being removed by azeotropical distillation by means of xylene. When the elimination of water has ceased and the xylene has been removed a product is obtained which dissolves in hot water to a clear solution and has the following constitution:

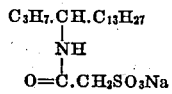

It may be used as washing agent.

(22) 27 parts of a mixture of isocyanates, used in Example 5, is run into 43 parts of an aqueous solution containing 30 per cent. of sodium sarcosine. The reaction is to be maintained alkaline to phenolphthalein, and the whole is stirred until the reaction product dissolves in water to a clear solution. A wetting agent is obtained.

(23) 17 parts of propylene oxide are added to 28 parts of 4-aminoheptadecane and then dimethyl sulfate is caused to react in a manner analogous to that described in Example 13. 60 parts of diethylether (anhydrous) is added and at 5° C. to 10° C. 12.5 parts of chlorosulfonic acid are caused to run in. After stirring for a short time the whole is neutralized by means of calcined sodium carbonate and a product is obtained which may be used as washing agent.

(24) 250 parts of a mixture of paraffin amines as used in Example 9 are mixed with 76 parts of glycolic acid and heated for 8 to 10 hours, while stirring, at 170° C. to 175° C. After that time all the amine has been transformed into the amide.

At 20° C. 308 parts of amide are run in 206 parts of sulfuric acid monohydrate, while stirring, thereupon 220 parts of fuming sulfuric acid containing 65 per cent of sulfuric acid anhydride are run in at 15° C. to 20° C. in the course of 1 to 2 hours. After stirring for a short time the whole is poured on a mixture of ice and sodium chloride, the water containing acid is separated, then the product stirred with twice or three times its quantity of water, and such a quantity of solid sodium chloride is added that the product is salted out, and once more the water containing acid separated. The product is then stirred together with 200 parts of water and neutralised by means of caustic soda solution. In this manner a wetting agent is obtained which is effective even in feeble concentration in neutral or alkaline solutions.

We claim:

1. The process of preparing capillary active compounds, which comprises reacting amines of the general formula:

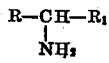

wherein R and R₁ stand for aliphatic hydrocarbon radicals each containing at least 3 carbon atoms and R and R₁ together containing at least 11 carbon atoms with an organic acid capable of being sulfonated, selected from the group consisting of aliphatic hydroxy acids, aliphatic unsaturated acids and aromatic acids, and subsequently sulfonating the condensation product.

2. The process of preparing capillary active compounds, which comprises reacting amines of the general formula:

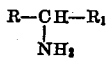

wherein R and R₁ stand for aliphatic hydrocarbon radicals each containing at least 3 carbon atoms and R and R₁ together containing at least 11 carbon atoms with an aliphatic hydroxy acid and subsequently sulfonating the condensation product.

3. The process of preparing capillary active compounds, which comprises reacting amines of the general formula:

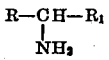

wherein R and R₁ stand for aliphatic hydrocarbon radicals each containing at least 3 carbon atoms and R and R₁ together containing at least 11 carbon atoms with glycolic acid and subsequently sulfonating the condensation product.

4. The process which comprises reacting 10-amino-nonadecane with glycolic acid and subsequently sulfonating the condensation product.

5. The process which comprises causing an amine mixture, obtained by transforming a mixture of paraffin carboxylic acids having a mean molecular weight of 150 into the corresponding mixture of ketones and hydrogenating the product obtained in the presence of ammonia, to react with glycolic acid and subsequently sulfonating the condensation product.

6. The process which comprises reacting 5-amino-monadecane with glycolic acid and subsequently sulfonating the condensation product.

7. As new compounds having capillary active properties the products of the general formula

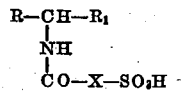

wherein R and R₁ stand for aliphatic hydrocarbon radicals each containing at least 3 carbon atoms and R and R₁ together containing at least 11 carbon atoms, CO.X stands for a member selected from the group consisting of the radicals of aliphatic hydroxy acids, aliphatic unsaturated acids and aromatic acids.

8. As new compounds having capillary active properties the products of the general formula $$\begin{array}{c} R-CH-R_1 \\ | \\ NH \\ | \\ CO-CH_2-O-SO_3H \end{array}$$

wherein R and R₁ stand for aliphatic hydrocarbon radicals each containing at least 3 carbon atoms and R and R₁ together containing at least 11 carbon atoms.

9. The product of the formula $$\begin{array}{c} C_9H_{19}-CH-C_9H_{19} \\ | \\ NH \\ | \\ CO-CH_2-O-SO_3H \end{array}$$

10. The product of the formula $$\begin{array}{c} R-CH-R \\ | \\ NH \\ | \\ CO-CH_2-O-SO_3H \end{array}$$

wherein $$\begin{array}{c} R-CH-R \\ | \\ NH \end{array}$$

stands for the radicals of an amine mixture obtained by transforming a mixture of paraffin carboxylic acids having a mean molecular weight of 150 into the corresponding mixture of ketones and hydrogenating the product obtained in the presence of ammonia.

11. The product of the formula $$\begin{array}{c} C_4H_9-CH-C_{14}H_{29} \\ | \\ NH \\ | \\ CO-CH_2-O-SO_3H \end{array}$$

LUDWIG ORTHNER.
CARL PLATZ.
HANS KELLER.
HEINZ SÖNKE.